Figure 1:
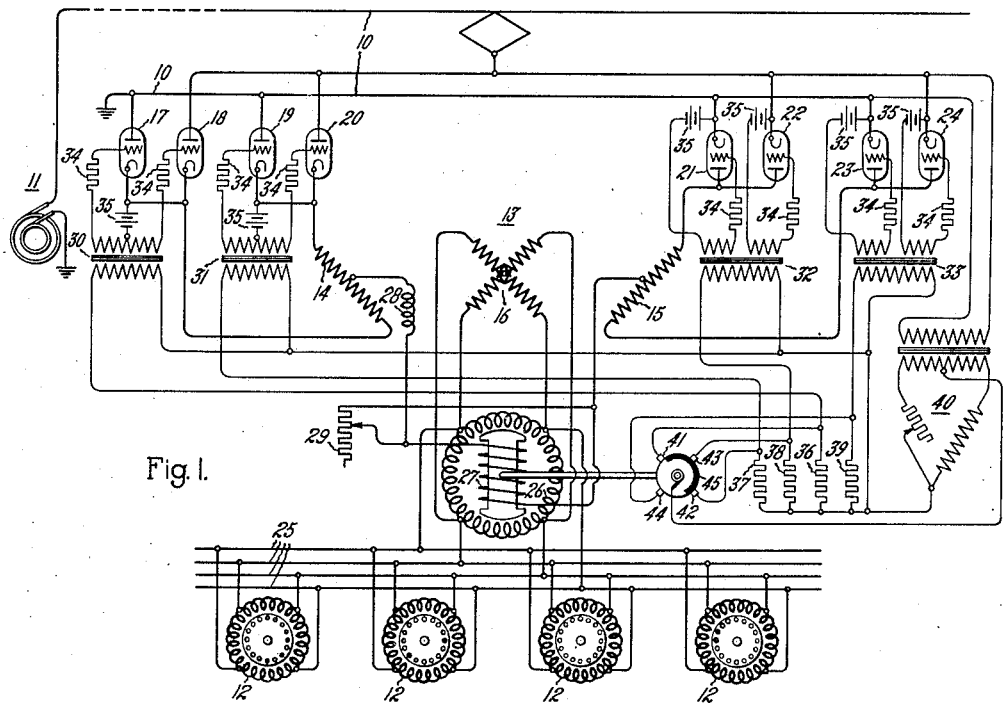

Dec. 12, 1933.    E. F. W. ALEXANDERSON    1,939,429
ELECTRIC VALVE CONVERTING SYSTEM
Filed May 9, 1933    2 Sheets-Sheet 1

Inventor:
Ernst F. W. Alexanderson,
by Charles E. Tullar
His Attorney.

Dec. 12, 1933.  E. F. W. ALEXANDERSON  1,939,429
ELECTRIC VALVE CONVERTING SYSTEM
Filed May 9, 1933     2 Sheets-Sheet 2

Inventor:
Ernst F. W. Alexanderson,
by Charles E. Mullan
His Attorney.

Patented Dec. 12, 1933

1,939,429

UNITED STATES PATENT OFFICE 1,939,429

ELECTRIC VALVE CONVERTING SYSTEM

Ernst F. W. Alexanderson, Schenectady, N. Y., assignor to General Electric Company, a corporation of New York Application May 9, 1933. Serial No. 670,127

11 Claims. (Cl. 172—237)

My invention relates to electric valve converting systems, and more particularly to such systems suitable for energizing an inductive alternating current load circuit, such for example, as an induction motor. While my invention is of general application, it is especially adapted for operating the traction motors of an electric locomotive at variable speed from an alternating current source of fixed frequency.

Heretofore there have been proposed several electric valve converting systems for energizing an alternating current motor or load circuit from a source of direct or alternating current. Certain of these arrangements of the prior art have had decided power factor limitations and have been suitable for supplying current only under leading power factor conditions on the alternating current load circuit, as for example, to an over-excited synchronous motor. Certain other of the arrangements of the prior art have been provided with additional apparatus for enabling the system to operate under any desired power factor conditions. Valve converting systems of this latter type have in general, been quite complicated in their circuit arrangements, and have required the use of a very large number of electric valves, which in installations of any considerable power places a serious economic limitation upon the use of such apparatus. Furthermore, in the application of electric valve converting systems to the energization of traction motors of an electric locomotive, to which my invention is particularly well adapted, definite space limitations favor an installation utilizing as few electric valves as possible and requiring a minimum of circuit apparatus.

It is an object of my invention, therefore, to provide an improved electric valve converting system which will overcome the above-mentioned shortcomings of the arrangements of the prior art, and which will be simple and reliable in operation.

It is another object of my invention to provide an improved electric valve converting system which is particularly suitable for energizing one or more induction motors from a source of current, and which will be reliable in operation under all power factor conditions on the load circuit.

It is a further object of my invention to provide an improved electric valve converting system utilizing a minimum number of electric valves and a minimum amount of circuit apparatus, which is of general application, but which is particularly suitable for energizing the traction motors of an electric locomotive.

In accordance with my invention, a source of current is connected to energize an alternating current load circuit comprising a pair of inductive networks through two groups of electric valves, one group connected to supply current from the source to one inductive network, and the other group connected to return the current to the source through the other inductive network. There is provided also, means for compensating for the inductive effect of the load circuit comprising capacitance means including a winding connected in the unidirectional current circuit interconnecting the pair of inductive networks. In accordance with one embodiment of my invention, this capacitance means comprises a synchronous condenser connected to the alternating current circuit and provided with a field winding serially connected in the direct current circuit of the apparatus. In accordance with another embodiment of my invention, the capacitance means comprises a capacitor serially connected in the direct current circuit of the apparatus through a series autotransformer.

For a better understanding of my invention, together with other and further objects thereof, reference is had to the following description taken in connection with the accompanying drawings, and its scope will be pointed out in the appended claims.

Figure 2:
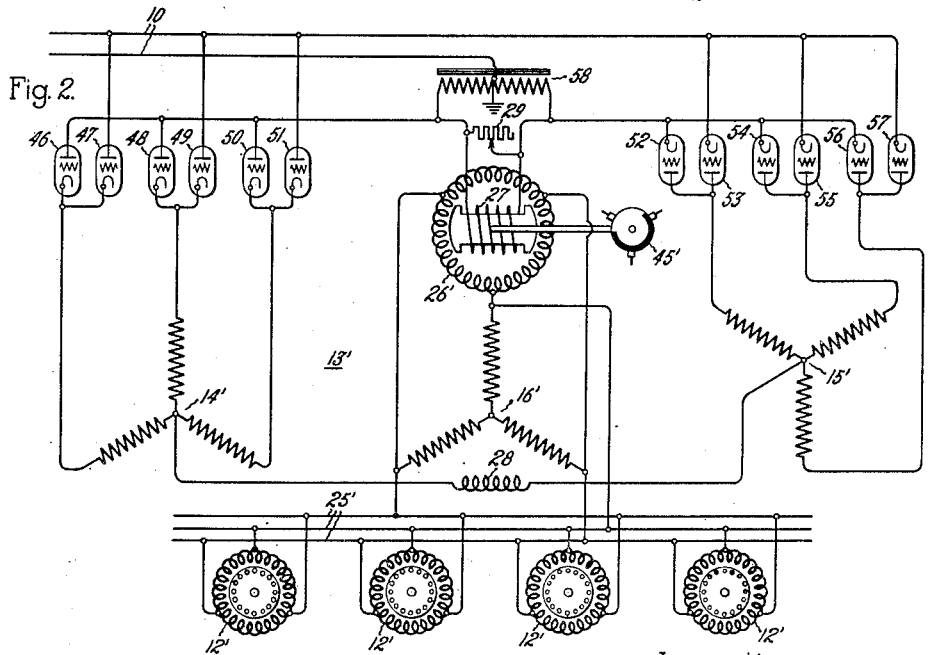
Figure 3:
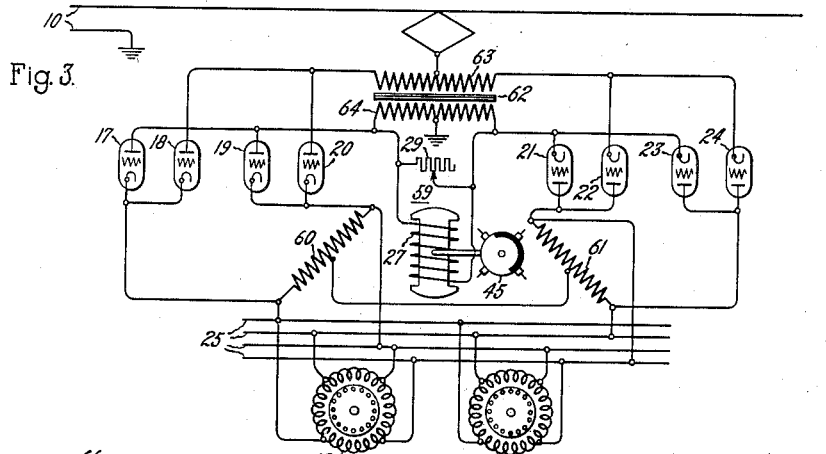
Figure 4:
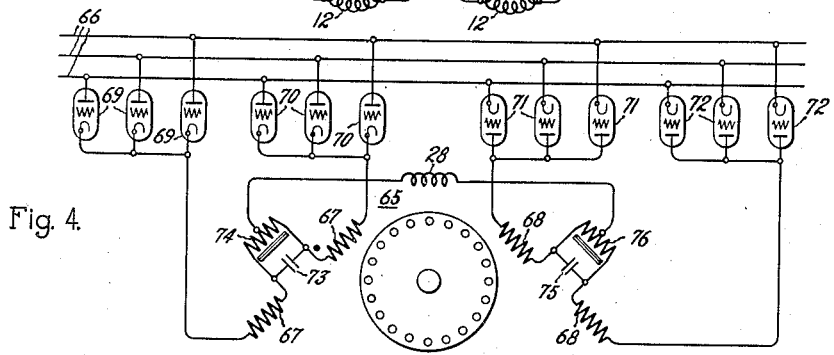
Figure 5:
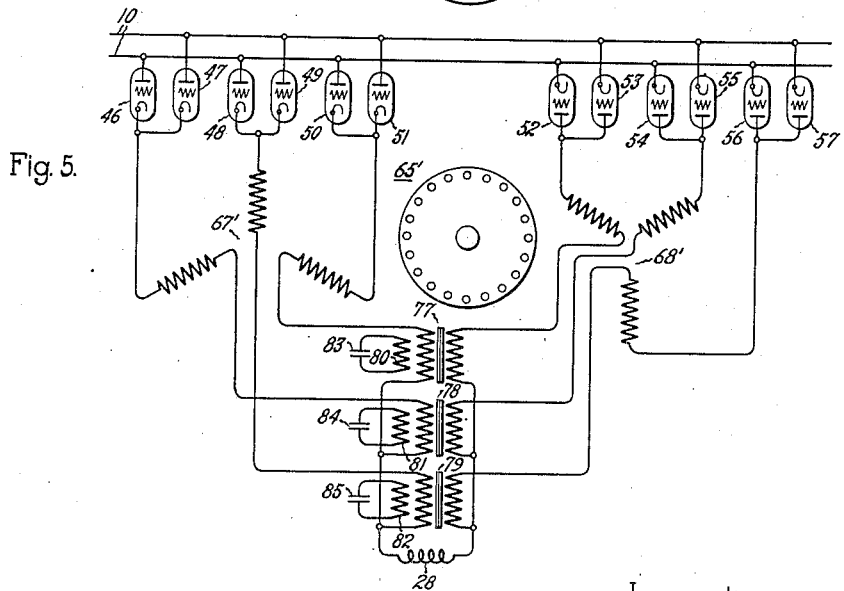

Referring more particularly to the drawings, Fig. 1 illustrates an arrangement embodying my invention for transmitting energy from a single phase alternating current source to a plurality of four-phase induction motors; Fig. 2 is a modification of Fig. 1 suitable for supplying three-phase induction motors and rearranged in such a manner that the series field of the synchronous condenser is substantially at ground potential. Fig. 3 is a modification of the arrangement of Fig. 2 in which the direct current smoothing reactance is included in the autotransformer provided for grounding the field of the synchronous condenser, while Figs. 4 and 5 illustrate other embodiments of my invention in which the synchronous condenser of the previous figures is replaced by a capacitor.

Referring now more particularly to Fig. 1 of the drawings, there is illustrated an electric valve converting system embodying my invention suitable for supplying energy from a trolley circuit 10 energized from a suitable source of alternating current 11 to a plurality of traction motors 12, which may be, as illustrated, of the induction type. The converting apparatus includes a quarter-phase transformer network 13 comprising separate primary networks 14 and 15 and a single secondary network 16. A group of electric valves 17, 18, 19 and 20 are connected to transmit energy from the trolley circuit 10 to the primary transformer network 14, while a group of oppositely connected electric valves 21, 22, 23 and 24 serves to return this current to the trolley circuit 10 through the primary transformer network 15. It will be noted that each terminal of the transformer networks 14 and 15 is interconnected with both sides of the trolley circuit through a pair of the valves 17—24, inclusive, which act as a full wave rectifier supplying unidirectional current to its respective phase terminal. Each of the several electric valves 17—24, inclusive, is provided with an anode, a cathode and a control grid, and may be of any of the several types well known in the art, although I prefer to use valves of the vapor electric discharge type.

The several phase terminals of the secondary network 16 are connected to a quarter-phase alternating current bus 25 from which the several traction motors 12 are energized. A quarter-phase synchronous condenser 26 is also connected to this alternating current circuit, while the rotating field winding 27 of the synchronous condenser 26 is included in unidirectional current circuit interconnecting the electrical neutrals of the networks 14 and 15. A current smoothing reactor 28 may also be included in this direct current circuit, while a variable resistor 29 may be connected in parallel to the field winding 27 to aid in controlling the speed torque characteristics of the motors 12. The above described arrangement for supplying energy from an alternating current circuit to one inductive network of an alternating current load circuit and returning the current to the supply circuit through a second inductive network and a second group of electric valves, minimizes any short circuit currents in the apparatus occasioned by the failure of any of the electric valves.

In order to control the conductivities of the several electric valves, the pairs of valves 17—18, 19—20, 21—22 and 23—24, are provided with grid transformers 30, 31, 32 and 33, respectively, while the grid of each of the several electric valves is connected to its respective cathode through a current limiting resistor 34 and a negative bias battery 35. In order to render the several pairs of valves 17—18, 19, 20, etc., conductive in a proper sequence, their associated grid transformers 30-33, inclusive, are excited with the potentials across the resistors 36-39, inclusive, respectively, which in turn, are energized from the trolley circuit 10 through a phase shifting circuit 40 and the brushes 41—44, respectively, of a distributor 45 driven directly by the rotor of the synchronous condenser 26. However, this feature of controlling the conductivity of a group of electric valves by a distributor mechanism driven by a motor energized through the valves forms no part of my present invention, but is disclosed and broadly claimed in my copending application, Serial No. 638,361, filed May 11, 1923, and assigned to the same assignee as the present application.

In explaining the operation of the above described apparatus, it will be assumed that the trolley circuit 10 is energized with an alternating current, preferably of a commercial frequency, and that the induction motors 12 and the synchronous condenser 26 are at standstill. Under these conditions the phase shifting circuit 40 is preferably adjusted so that the alternating potential output thereof impressed upon the resistors 36-39 inclusive through the distributor 45 is substantially in quadrature with the potential of the trolley circuit 10. Under these conditions, those grid transformers of the group 30-33, inclusive, which are energized through the distributor 45 will impress upon the grids of their associated valves alternating potentials substantially in quadrature with their anode potentials so that the average voltage impressed upon the primary networks 14 and 15 will be substantially zero or a very small value. With the rotor of the synchronous condenser 26 and the distributor 45 in the position illustrated in the drawings, it will be noted that the resistors 36 and 39 are energized through the brushes 41 and 44, respectively, from the phase shifting circuit 40, and the potentials across these resistors serve to excite the grid transformers 30 and 33, respectively. The excitation of the grid transformers 30 and 33 enables the electric valves 17 and 18 to operate as a controlled rectifier supplying unidirectional current through the lower portion of the primary winding 14 of the transformer 13, the unidirectional current circuit including the reactor 28, the field winding 27 of the synchronous condenser 26, and the lower portion of the primary network 15. The mechanical phase relation of the distributor 45 with respect to the field winding 27 is such that with current building up in the circuit just traced, a current of the proper phase relation will also be supplied to the synchronous condenser 26 to produce a torque on the rotor and accelerate it from rest. Assuming a clockwise direction of rotation of the synchronous condenser 26, ninety degrees later the resistor 38 will be energized through the brush 43 while the resistor 39 will be deenergized through the brush 44, thus transferring the rectified current from the pair of valves 23 and 24 to the pair of valves 21 and 22, so that the current now flows through the upper portion of the primary network 15 advancing the magnetomotive force of the polyphase transformer 13 through ninety electrical degrees. Obviously, the magnetomotive force of the synchronous condenser 26 is also advanced ninety electrical degrees so that it is again in torque producing position with respect to mechanical position of its rotor. In this manner the current is successively transferred between the several pairs of electric valves, the magnetomotive force of the transformer 13 and the synchronous condenser 26 successively advancing so as always to be in torque producing position with respect to the field of the condenser 26.

As is well understood by those skilled in the art, the average voltage impressed upon the alternating current load circuit, and thus the energy supplied thereto, may be readily controlled by advancing the phase of the grid potentials supplied to the several electric valves by means of the phase shifting circuit 40. With no mechanical load on the synchronous condenser 26 it would tend to function in a manner similar to a direct current series motor, since, it is seen its field is excited with the load current of the apparatus so that it constitutes, in effect, a series excited synchronous machine synchronously commutated, which is also given as a definition of a direct current motor. However, as the magnetomotive force of the transformer network 13 and the synchronous condenser 26 accelerates, and with it the electromotive force of the alternating current bus 25, a sufficient torque will be produced on the squirrel cage rotors of the several induction motors 12 to overcome the starting torque of the locomotive and to produce an acceleration thereof, thus limiting the frequency on the alternating current bus 25 to a value dependent upon the load and the speed of the motors 12. Obviously, an increase in load drawn by the motors 12 increases the excitation of the synchronous condenser 26 and thus reduces its speed of rotation and the frequency of the alternating current generated. Thus, the speed control may be effected by adjustment of the phase shifting circuit 40 or additional speed control may be obtained by means of the variable resistor 29 connected across the field winding 27 of the synchronous condenser 26 in a manner exactly analogous to the field control of a direct current machine. When the speed of the synchronous condenser 26 approaches or passes through synchronism, with respect to the frequency of the alternating current circuit 10, its counter-electromotive force is effective to commutate the current between the several electric valves since frequency commutation of the supply circuit is ineffective at these speeds.

The above described system imparts to the induction motors 12 operating characteristics similar to those of direct current series motors, which, it is recognized, are particularly advantageous for traction work. Such an arrangement has been found to be particularly stable under all operating conditions. If, however, it is desired that the motors 12 should have shunt characteristics, the field winding 27 of the synchronous condenser 26 may be energized from any auxiliary independent source of direct current.

In the arrangement illustrated in Fig. 1 it will be noted that the field winding of the synchronous condenser 26 is at a potential substantially half way between ground and the trolley potential, while in some installations, particularly those of high operating voltages, it is desirable that the field winding of the synchronous machine be at substantially ground potential. This result can be attained by a slight rearrangement of the circuit of Fig. 1 to that shown in Fig. 2 of the drawings, which, in addition, is modified for the operation of three-phase induction motors instead of the quarter-phase induction motors included in the system of Fig. 1. In this arrangement current is transmitted from the source 10 through a group of electric valves comprising the pairs 46—47, 48—49 and 50—51, connected to the several phase terminals of the three-phase primary transformer network 14' of the transformer 13', through the direct current circuit including the smoothing reactor 28, the primary network 15' of the transformer 13', and a second group of electric valves comprising the pairs 52—53, 54—55 and 56—57, connecting the several terminals of the transformer network 15' to the alternating current supply circuit 10. As in the arrangement of Fig. 1, the transformer 13' is provided with a secondary network 16' connected to a three-phase alternating current bus 25' from which the induction traction motors 12' are energized. As in the arrangement of Fig. 1, a three-phase synchronous condenser 26' is energized directly from the alternating current bus 25'. In this arrangement, however, the connections of one valve of each of the pairs of the group 46–51, inclusive, and one valve of each of the pairs of the group 52–57 inclusive, are made through opposite halves of a reactance device 58 provided with an electrical midpoint which is connected to one side of the supply circuit 10 and is also grounded. With this arrangement, the field winding 27 of the synchronous condenser 26' may be connected in parallel to the reactance device, as is also the speed regulating field resistor 29.

With such an arrangement, if the upper side of the alternating current supply circuit 10 is positive for example, current will flow through one of the group of valves 47—49—51, the transformer primary network 14', smoothing reactor 28, the transformer primary network 15', one of the valves of the group 52—54—56, the right hand portion of the reactance device 58 to the other side of the supply circuit. However, the reactance device 58 acts as an autotransformer and a portion of the current will divide, passing through the field winding 27 and the left hand portion of the reactance device 58, the current dividing in accordance with the relative impedances of these two paths. On the other hand, if it is permissible to provide an intermediate terminal for the field winding 27 of the synchronous condenser 26', the field winding 27 may be connected directly in place of the reactance 58 in which case an auxiliary reactance device is unnecessary. In all other respects, the manner of operation is similar to that described above in connection with Fig. 1.

The system illustrated in Fig. 3 is a modification of both the arrangements of Fig. 1 and Fig. 2 for transmitting energy from a single phase alternating current circuit 10 to a quarter-phase alternating current circuit 25 of variable frequency. In this arrangement the power transformer 13 of the arrangement of Fig. 1 is omitted and the inductive networks 60 and 61 of the synchronous condenser 59 are energized directly from the alternating current supply circuit 10 through the electric valves 17–24, inclusive, in a manner similar to that of Fig. 1. The arrangement for energizing the field winding 27 of the synchronous condenser 59, however, is a modification of that of Fig. 2, in which the connections of the several electric valves 17–24, inclusive, to both sides of the supply circuit 10 are made through inductively coupled windings 63 and 64 of a reactance device 62, which may be provided with considerable leakage reactance to replace the smoothing reactor 28 of the arrangements of Figs. 1 and 2, which has been omitted. The operation of this system is similar to that illustrated in Fig. 2, the magnetomotive force of each portion of the windings 63 and 64 being unidirectional. As in the system of Fig. 2, if it is permissible to have two independent field windings with two electrical midpoints, the reactance device 62 may comprise the field winding of the synchronous condenser 59 and thus avoid the use of an additional reactance device. From the disclosure of Fig. 3, it will be apparent to those skilled in the art that the transformer apparatus of the arrangements of Figs. 1 and 2 may be omitted and that the networks 14 and 15, and 14' and 15' may respectively comprise the armature windings of the synchronous condensers 26 and 26'.

In Fig. 4 of the drawings is shown a system for energizing a single quarter-phase squirrel cage induction motor 65 from a three-phase alternating current supply circuit 66. The capacitance provided by the series excited synchronous condenser in the previous arrangements, is now supplied by capacitors. In this system the induction motor 65 is provided with a pair of networks 67 and 68, each open at the electrical neutral. The groups of electric valves 69 and 70 are connected to transmit current from the supply circuit 66 to the terminals of the inductive network 67, while the groups of electric valves 71 and 72 are connected to return the current to the source through the network 68, a smoothing reactor 28 being included in the direct current circuit interconnecting the neutrals of the networks 67 and 68 as in the arrangements described above. Interposed in the open neutral of the network 67 are a parallel connected capacitor 73 and inductive winding 74 provided with an electrical midpoint. Similarly, a parallel connected capacitor 75 and inductive winding 76 are interposed in the open neutral of the network 68, while the electrical neutrals of the windings 74 and 76 are interconnected though a direct current circuit including the smoothing reactor 28. In such a system the grids of the several electric valves may be controlled by an independent speed controlled pilot generator, or by a commutator driven directly from the induction motor through a speed increasing mechanism, such for example, as is disclosed in my copending application Serial No. 638,361, filed May 11, 1923, and assigned to the same assignee as the present application.

The general principles of operation of this system are similar to those of the systems described above with the exception of the manner in which the phase of the current drawn by the motor is corrected for improving the power factor on the supply circuit and supplying a proper commutating voltage. Assume for example, that at a given instant, the groups of valves 69 and 71 are rendered conductive by the grid commutator. Current will then flow through the group of valves 69, the lower portion of the network 67, the lower portion of the inductive winding 74, the reactor 28, the upper portion of inductive winding 76, the upper portion of the network 68, and the group of valves 71 to the supply circuit 66. If the inductive winding 74 is designed with a relatively low leakage reactance, it will act as an autotransformer, the primary current flowing in the lower portion being balanced by a substantially equal and opposite current in the upper portion, the only path for which is through the capacitor 73. Thus, the capacitor 73 is effectively in series circuit relation with the current in the direct current circuit of the apparatus. Similarly, the capacitor 75 is effectively in series with the current in the direct current circuit of the apparatus. As the current is commutated between the terminals of each of the networks 67 and 68 it reverses in the inductive windings 74 and 75, at the same time charging the capacitors 73 and 75 to opposite polarities. Thus the potentials across the capacitors 73 and 75 are alternating and variable in magnitude in accordance with the load current drawn by the induction motor 65 and their phase relation will be such as to bring the phase of the resultant counter-electromotive force between the motor terminals in proper relation to commutate the load current between the groups of valves 69, 70, 71 and 72. With such an arrangement, the heavier the load drawn by the motor, when the current which must be commutated is a maximum, there is also provided a maximum commutating voltage by the series capacitors 73 and 75.

In Fig. 5 there is illustrated a modification of the system shown in Fig. 4 for transmitting energy from a single phase alternating current supply circuit 10 to a squirrel cage induction motor 65' provided with independent double three-phase windings 67' and 68'. These windings are interconnected with the supply circuit 10 through the electric valves 46–57, inclusive, arranged similarly to the electric valves of the system of Fig. 2. The several phase windings of the networks 67' and 68' are interconnected through mutually coupled windings of the reactance device 77, 78 and 79, respectively, and through the common direct current circuit including a smoothing reactor 28. The reactance devices 77, 78 and 79 are provided with tertiary windings 80, 81 and 82 connected in circuit with capacitors 83, 84 and 85 respectively. If current is flowing in only one of the windings of each of the reactance devices 77, 78 and 79 at any given instant, the capacitors 83, 84 and 85 are effectively in series with the load current of their respective phase windings and build up a voltage variable in magnitude in accordance with the load current drawn by the motor and of a proper phase relation to compensate for the lagging power factor of the motor and to assist in commutation between the several electric valves, as in the arrangement of Fig. 4. In certain cases, it may be preferable to provide the windings 74 and 76 of the arrangement of Fig. 4 and 77, 78 and 79 of the arrangement of Fig. 5 with an appreciable leakage reactance, which, together with their respective capacitors, are tuned to a predetermined harmonic of the fundamental voltage.

While I have illustrated several specific embodiments of my invention, it will be obvious to those skilled in the art that it is applicable to the transmission of energy from a supply circuit of any number of phases to an inductive alternating current load circuit of any number of phases either with or without the interposition of an auxiliary transformer.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electric valve converting system comprising a source of current, an inductive alternating current load circuit including a pair of inductive networks, a group of similarly connected electric valves interconnecting said source and one of said networks, a second group of valves connected oppositely to said first group and interconnecting the other of said networks and said source, said system including a circuit carrying a unidirectional current dependent upon the load on said system, means for controlling the conductivity of said valves, and means for compensating for the inductive effect of said load circuit comprising capacitance means including a winding connected in series with the load current of the system.

2. An electric valve converting system comprising a source of current, an inductive alternating load circuit including a pair of inductive networks, a group of similarly connected electric valves interconnecting said source and one of said networks, a second group of electric valves connected oppositely to said first group and interconnecting the other of said networks and said source, means for controlling the conductivity of said valves, and means for compensating for the inductive effect of said load circuit comprising capacitance means including a winding interconnecting said networks.

3. An electric valve converting system comprising a source of current, an inductive alternating current load circuit including a pair of inductive networks, a group of electric valves connected to transmit current from said source to one of said networks, a second group of electric valves connected to return said current to said source through the other of said networks, said networks being interconnected through a direct current circuit, means for controlling the conductivity of said valves, and means for compensating for the inductive effect of said load circuit comprising capacitance means including a winding interposed in said direct current circuit.

4. An electric valve converting system comprising a source of current, an inductive alternating current load circuit including a pair of inductive networks, a group of similarly connected electric valves interconnecting said source and one of said networks, a second group of electric valves connected oppositely to said first group and interconnecting the other of said networks and said source, a direct current circuit interconnecting said networks, means for controlling the conductivity of said valves, and means for commutating the current between said valves under lagging power factor conditions on said alternating current circuit comprising capacitance means including a winding in series circuit relationship with said direct current circuit.

5. An electric valve converting system comprising a source of current, an inductive alternating current load circuit including a pair of inductive networks, a group of similarly connected electric valves interconnecting said source and one of said networks, a second group of valves connected oppositely to said first group and interconnecting the other of said networks and said source, said system including a circuit carrying a unidirectional current dependent upon the load on said system, means for controlling the conductivity of said valves, and a synchronous condenser connected to said alternating current circuit and provided with an exciting winding in series circuit relation with said unidirectional current circuit.

6. An electric valve converting system comprising a source of current, an inductive alternating current load circuit including a pair of inductive networks, a group of similarly connected electric valves interconnecting said source and one of said networks, a second group of valves connected oppositely to said first group and interconnecting the other of said networks and said source, said system including a circuit carrying a unidirectional current dependent upon the load on said system, a synchronous condenser connected to said alternating current circuit and provided with an exciting winding connected in series with said unidirectional current circuit, and a distributor device driven by said condenser for rendering said valves conductive in a predetermined sequence.

7. An electric valve converting system comprising a source of current, an inductive alternating current load circuit including a pair of inductive networks, a group of electric valves connected to transmit current from said source to one of said networks, a second group of electric valves connected to return said current to said source through the other of said networks, said networks being interconnected through a direct current circuit, means for controlling the conductivity of said valves, and a synchronous condenser connected to said alternating current circuit and provided with a field winding included in said direct current circuit.

8. An electric valve converting system comprising a source of current, an inductive alternating current load circuit including a pair of inductive networks, a group of electric valves connected to transmit current from said source to one of said networks, a second group of electric valves connected to return said current to said source through the other of said networks, means for controlling the conductivity of said valves, an inductive winding interconnecting the valves of said groups connected to the same side of said source, said inductive winding being provided with an electrical midpoint connected to said side of said source and end terminals connected respectively to said valves of said groups, and a synchronous condenser connected to said alternating current circuit and provided with a field winding connected across said inductive winding.

9. An electric valve converting system comprising a source of current, an inductive alternating current load circuit including a pair of inductive networks, a group of electric valves connected to transmit current from said source to one of said networks, a second group of electric valves connected to return said current to said source through the other of said networks, said networks being interconnected through a direct current circuit, means for controlling the conductivity of said valves, and means for compensating for the inductive effect of said load circuit comprising capacitor means connected in series circuit relation with said direct current circuit.

10. An electric valve converting system comprising a source of current, an inductive alternating current load circuit including a pair of inductive networks each provided with an open neutral, a group of electric valves connected to transmit current from said source to one of said networks, a second group of electric valves connected to return said current to said source through the other of said networks, a parallel connected capacitor and inductive winding inserted in the open neutral of each of said networks, each of said inductive networks being provided with an electrical neutral, and a direct current circuit interconnecting said electrical neutrals.

11. An electric valve converting system comprising a source of alternating current of commercial frequency, an alternating current circuit including an induction motor, said load circuit and motor including a pair of inductive networks, and apparatus for operating said motor over a range of speeds above and below synchronism comprising a group of similarly connected electric valves interconnecting said source and one of said networks, a second group of valves connected oppositely to said first group and interconnecting the other of said networks and said source, said system including a circuit carrying a unidirectional current dependent upon the load on said system, means for controlling the conductivity of said valves, and means for commutating the current between said valves at speeds near or above synchronism comprising capacitance means including a winding connected in said unidirectional current circuit.

ERNST F. W. ALEXANDERSON.